UNITED STATES PATENT OFFICE.

KARL FISCHMANN, OF ARCHDALE, NORTH CAROLINA, ASSIGNOR TO WILLIAM G. BROKAW, OF ARCHDALE, NORTH CAROLINA.

PROCESS OF PRODUCING SHAVING-CREAM.

1,091,052.   Specification of Letters Patent.   Patented Mar. 24, 1914.

No Drawing.   Application filed January 17, 1913.   Serial No. 742,692.

*To all whom it may concern:*

Be it known that I, KARL FISCHMANN, a subject of the Emperor of Austria-Hungary, residing at Archdale, in the county of Randolph and State of North Carolina, have invented certain new and useful Improvements in Processes of Producing Shaving-Cream, of which the following is a specification.

This invention relates to shaving creams and to a process of manufacturing the same.

An object of the invention is to provide a superior cream which is primarily intended for application to the face before shaving, and the characteristics of this cream are such that it may be applied to the face by the hands of the user and will go directly into the pores of the skin and effectually soften the beard in such manner that the beard may be shaved off without the use of soap, and moreover without the use of the ordinary shaving brush which is a well known germ carrier in barber shops and other public shaving places.

Creams which have been heretofore offered in the market for use in shaving are in the nature of soaps to which water must be added and a brush or similar means used to work up a lather. The cream herein described differs essentially from those in that it has no lather producing element, and hence may be applied to the face and rubbed into the skin without a brush, and will nevertheless so effectually soften the beard as to be a perfect substitute for soap, and will obviate the necessity for the objectionable cup and brush.

Another object of the invention is to produce a superior cream which will be found useful as a massage cream, or for other purposes where a cream having its characteristics is desired.

Another object of the invention is to produce a new and improved process for producing the cream having the qualities and advantages above pointed out.

The constituents employed in the production of my improved cream are water, lanolin, stearin and ammonia, which are preferably combined in the manner hereinafter set forth.

In the preferred manner of practising the process contemplated by the invention, first, one and one-quarter pounds of stearin are melted and placed in a suitable bowl or receptacle; second, eight ounces of lanolin are added to one gallon of heated water whose temperature is below the boiling point at atmospheric pressure, but is sufficiently high to melt the lanolin; third, one ounce of a 25% solution of spirits of ammonia is dissolved in five ounces of boiling water; fourth, the six ounce solution of water and spirits of ammonia and the mixture of water and lanolin are then gradually added to the stearin while the mass is being stirred, the addition of the lanolin and ammonia solutions being so timed that the last ounce of each is added to the stearin at substantially the same moment so that these additions are finished together. This mixture is then stirred for about one hour and fifteen minutes or until the cream reaches the proper consistency.

It is to be observed that the water to which the lanolin is added is not boiling, and that the temperature of the compound during the mixing operation is never raised to the boiling point, for experience has demonstrated the fact that this is unnecessary, and will produce undesirable results in the finished cream.

Preferably the cream is rendered antiseptic by a suitable quantity of boric acid, and any perfumes desired may be added to this cream to suit the individual taste.

Having thus described my invention, what I claim and desire to secure by Letters Patent of the United States is:—

The process of producing a shaving cream consisting in melting one and one quarter pounds of stearin in a suitable receptacle, adding eight ounces of lanolin to one gallon of heated water of a temperature to melt the lanolin, dissolving one ounce of a 25% solution of spirits of ammonia in five ounces of boiling water, adding the lanolin and ammonia solutions gradually to the stearin while the mass is being stirred, and so timing these additions that the last ounce of each is added to the stearin at substantially the same time, and finally stirring the mixture until a cream of the proper consistency is produced.

In testimony whereof I affix my signature in presence of two witnesses.

KARL FISCHMANN.

Witnesses:
W. C. HAMMOND,
H. A. TOMLINSON.